(12) United States Patent
Roselle (10) Patent No.: US 8,162,349 B1
(45) Date of Patent: Apr. 24, 2012

(54) COLLAPSIBLE CARRIER

(76) Inventor: Michael J. Roselle, Fort Wayne, IN (US)

( * ) Notice: Subject to any disclaimer, the term of this patent is extended or adjusted under 35 U.S.C. 154(b) by 351 days.

(21) Appl. No.: 12/653,746

(22) Filed: Dec. 17, 2009

Related U.S. Application Data (60) Provisional application No. 61/203,059, filed on Dec. 18, 2008.

(51) Int. Cl.
*B62B 1/12* (2006.01)

(52) U.S. Cl. .......................... 280/654; 280/639; 280/651

(58) Field of Classification Search .................. 280/639, 280/38, 651, 652, 654, 659
See application file for complete search history.

(56) References Cited

U.S. PATENT DOCUMENTS

| | | |
|---|---|---|
| 2,020,766 A | 11/1935 | Brown |
| 2,421,751 A | 6/1947 | Giordano |
| 2,472,203 A | 6/1949 | Friedmann et al. |
| 3,677,571 A | 7/1972 | Maturo, Jr. et al. |
| 3,797,847 A | 3/1974 | Lindsey et al. |
| 3,836,164 A | 9/1974 | Sugino et al. |
| 3,945,660 A | 3/1976 | Zalewski |
| 4,055,357 A | 10/1977 | Sorocin |
| 4,349,213 A | 9/1982 | Hirsch |
| 4,369,987 A | 1/1983 | Witherell |
| 4,452,468 A | 6/1984 | Eads et al. |
| 4,521,030 A | 6/1985 | Vance |
| 4,759,559 A | 7/1988 | Moulton |
| 4,865,346 A | 9/1989 | Carlile |
| 4,887,837 A | 12/1989 | Bonewicz, Jr. et al. |
| 5,197,754 A | 3/1993 | Ward |
| 5,244,219 A | 9/1993 | Hadlum |
| 5,660,476 A | 8/1997 | DeCoster |
| 5,915,722 A | 6/1999 | Thrasher et al. |
| 5,988,671 A | 11/1999 | Abelbeck et al. |
| 6,354,619 B1* | 3/2002 | Kim .............................. 280/651 |
| 6,438,773 B1* | 8/2002 | Hsia ................................ 5/99.1 |
| 6,471,236 B1 | 10/2002 | Eskridge |
| 6,491,318 B1 | 12/2002 | Galt et al. |
| 6,598,898 B2 | 7/2003 | Chu |
| 6,929,230 B2 | 8/2005 | Tsai |
| 6,932,427 B2* | 8/2005 | Tamura ...................... 297/217.1 |
| 7,281,731 B2 | 10/2007 | Shamah |
| 2009/0212536 A1* | 8/2009 | Tadeo ........................... 280/655 |

\* cited by examiner

*Primary Examiner* — John Walters
(74) *Attorney, Agent, or Firm* — Bose McKinney & Evans LLP (57) ABSTRACT

A collapsible carrier having four corner post members. Framing assemblies extend between adjacent corner post members and form collapsible "X" shaped assemblies. A storage container is suspended within the carrier and a central bracing assembly is disposed above the container. The central assembly includes four rigid members and a centrally located bracket. The carrier can be easily deployed by pressing the centrally located bracing bracket downwardly to lock the carrier into an expanded configuration. The carrier may also include a collapsible shelf. Another collapsible carrier having a hand truck configuration is also disclosed. The hand truck carrier includes a pivotal support structure with hinged cross members. A linkage member extends between the hinges of the cross members to facilitate the collapse of the carrier.

17 Claims, 10 Drawing Sheets

COLLAPSIBLE CARRIER

CROSS REFERENCE TO RELATED APPLICATIONS

This application claims priority under 35 U.S.C. 119(e) of U.S. provisional patent application Ser. No. 61/203,059 filed on Dec. 18, 2008 entitled COLLAPSIBLE CARRIER the disclosure of which is hereby incorporated herein by reference.

BACKGROUND OF THE INVENTION

1. Field of the Invention

The present invention relates to carrying devices and, more particularly, to collapsible carriers.

2. Description of the Related Art

Figure 10:
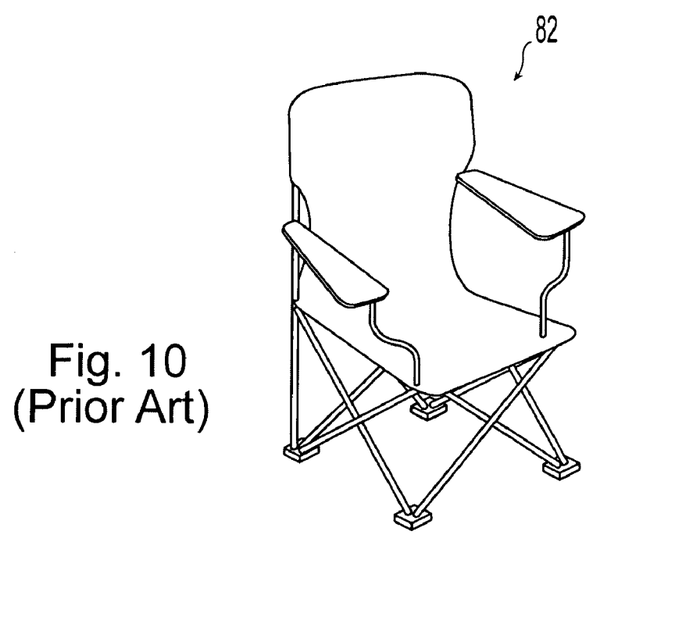
FIG. 10 is a perspective view of a prior art collapsible chair.

Many times people attending recreational events such as youth soccer games will need to bring their own seating. Light weight collapsible chairs are widely available and often used for recreational events. One common type of collapsible chair is formed by an assemblage of folding metal tubes on which a fabric sheet forming the seat and back panel of the chair is hung. FIG. 10 illustrates an example of such a chair. These collapsible chairs typically collapse to form a cylindrical bundle which can be inserted into a fabric sleeve for transport or storage.

While the light weight and collapsible nature of these chairs allows them to be relatively easily transported for the distances between vehicle parking facilities and associated recreational facilities, when more than one of these chairs, or when additional items, such as a cooler, must be carried it can be difficult for a single person to carry all such items.

SUMMARY OF THE INVENTION

The present invention provides a collapsible carrier that can be used to transport a wide variety of different items and, in some embodiments, is particularly well adapted to carry a plurality of collapsible chairs.

The invention comprises, in one form thereof, a collapsible carrier that includes four elongate corner post members with each of the corner post members having an upper end, a lower end and defining an axial length therebetween. The corner post members define a pair of rear corner post members and a pair of forward corner post members wherein each of the rear corner post members has a rotatable support wheel secured thereto proximate the lower end thereof. The carrier also includes four framing assemblies with each of the framing assemblies being operably disposed between a respective set of adjacent corner post members to thereby define four sides of the carrier. Each of the framing assemblies includes a first rigid elongate framing member and a second rigid elongate framing member with the first and second framing members being pivotally secured together proximate midpoints of each of the first and second framing members with lower ends of the first and second framing members being pivotally secured to opposite ones of the adjacent corner post members at fixed axial locations and upper ends of the first and second framing members being pivotally and axially slidably secured to the adjacent corner post members at axial locations respectively above the fixed axial locations of the other framing member whereby each of said framing assemblies is repositionable between an X-shaped expanded configuration with the adjacent corner post members being spaced apart and a collapsed configuration with the adjacent corner post members being positioned proximate one another. The carrier also includes a central bracing assembly having a central bracket member and four rigid elongate bracing members. Each of the bracing members has a first end pivotally secured to the central bracket member and a second end pivotally and axially slidably secured to a respective one of the corner post members at an axial position proximate a respective one of the upper ends of the framing members. The central bracing assembly defines a substantially X-shaped assembly disposed centrally between the four corner post members when each of the framing assemblies is in the expanded configuration and, when each of the framing assemblies is in the collapsed configuration, the bracing assembly is in a collapsed configuration. A flexible container is secured to the carrier and is positioned below the central bracing assembly when each of the framing assemblies is in the expanded configuration.

The invention comprises, in another form thereof, a collapsible carrier that includes four elongate corner post members. Each of the corner post members has an upper end, a lower end and defines an axial length therebetween. The corner post members define a pair of rear corner post members and a pair of forward corner post members wherein each of the rear corner post members has a rotatable support wheel secured thereto proximate the lower end thereof. The carrier also includes four framing assemblies. Each of the framing assemblies is operably disposed between a respective set of adjacent corner post members to thereby define four sides of the carrier. Each of the framing assemblies includes a first rigid elongate framing member and a second rigid elongate framing member with the first and second framing members being pivotally secured together proximate midpoints of each of the first and second framing members. Lower ends of the first and second framing members are pivotally secured to opposite ones of the adjacent corner post members at fixed axial locations and upper ends of the first and second framing members are pivotally and axially slidably secured to the adjacent corner post members at locations above the respective fixed axial locations of the other framing member whereby each of the framing assemblies is repositionable between an X-shaped expanded configuration with the adjacent corner post members being spaced apart and a collapsed configuration with the adjacent corner post members being positioned proximate one another. The carrier also includes a central bracing assembly having a central bracket member and four rigid elongate bracing members. Each of the bracing members has a first end pivotally secured to the central bracket member and a second end pivotally and axially slidably secured to a respective one of the corner post members at an axial position proximate a respective one of the upper ends of the framing members. The central bracing assembly defines a substantially X-shaped assembly disposed centrally between the four corner post members when each of the framing assemblies is in the expanded configuration and, when each of the framing assemblies is in the collapsed configuration, the bracing assembly is in a collapsed configuration. The bracing members are each pivotally coupled with a respective one of the corner post members at an axial position located proximate a midpoint of each of the respective corner post members when the carrier is an expanded configuration. The carrier further includes a plurality of sliding pivot blocks. At least one of the plurality of sliding pivot blocks is axially slidably disposed on each of the corner post members. The upper ends of the framing members are each pivotally secured to one of the sliding pivot blocks and the second ends of the bracing members are also each pivotally secured to one of the sliding pivot blocks. A flexible container is secured to the carrier and is positioned below the central bracing assembly when each of the framing assemblies is in the expanded configuration.

The invention comprises, in yet another form thereof, a collapsible carrier having first and second rigid elongate upright members with each of the upright members defining an axis and having a wheel rotatably secured thereto proximate a lower end thereof. The carrier also includes a bracing assembly including first and second rigid elongate bracing members. Each of the bracing members has a first end pivotally secured to a respective one of the uprights at an axially fixed location on the upright and a second end pivotally and axially slidably secured to the opposite one of the uprights. The first and second bracing members are pivotally secured together proximate midpoints of each of the bracing members whereby the bracing assembly is repositionable between an X-shaped expanded configuration with the upright members being spaced apart and a collapsed configuration with the upright members being positioned proximate one another. The carrier further includes a pivotal and laterally collapsible support structure. The support structure includes first and second rigid elongate support members. The first and second support members each have a proximal end, said proximal ends being pivotally secured to the first and second upright members respectively proximate the lower ends thereof. The carrier also includes distal and proximal rigid elongate cross members with each of the cross members having a hinged midsection. The distal cross member has a first end pivotally secured to the first support member proximate a distal end of the first support member and a second end pivotally secured to the second support member proximate the distal end of the second support member. The proximal cross member has a first end pivotally secured to the carrier proximate the lower end of the first upright member and a second end pivotally secured to the carrier proximate a lower end of the second upright member. A linkage member extends between and is secured to the hinged midsections of the distal and proximal cross members wherein pivotally collapsing the distal cross member at the hinged midsection of the distal cross member displaces the hinged midsection of the proximal cross member and thereby pivotally collapses the proximal cross member.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION OF THE INVENTION

Figure 1:
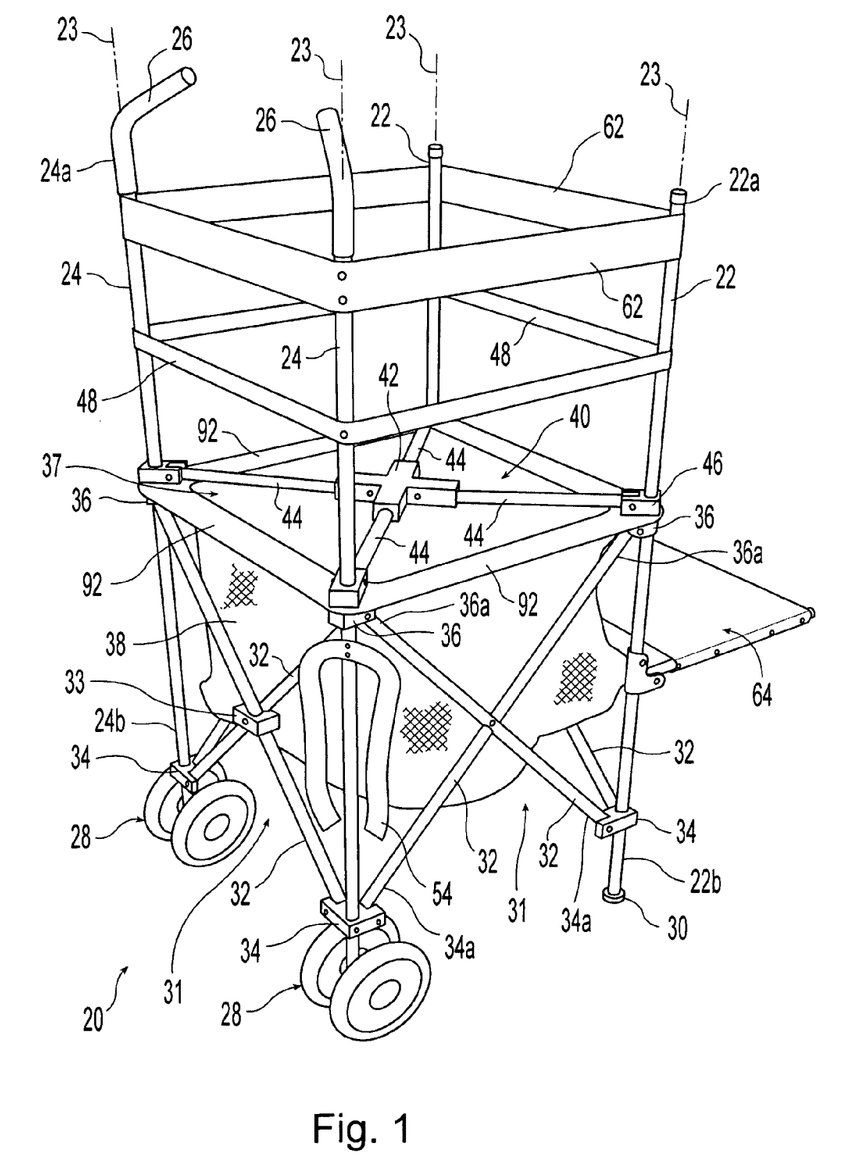
FIG. 1 is a perspective view of a first embodiment of the invention.
Figure 2:
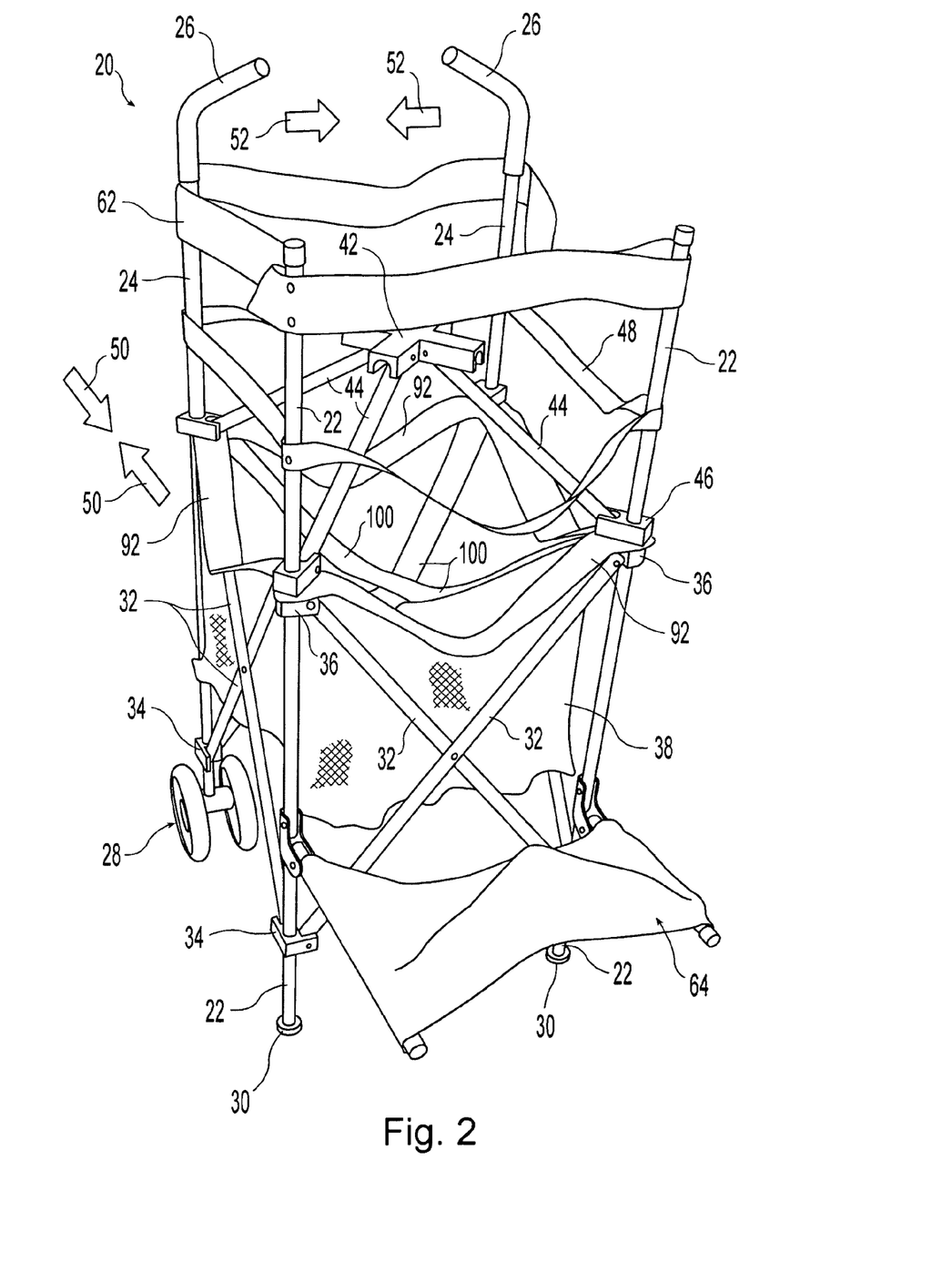
FIG. 2 is a perspective view of the first embodiment in a partially collapsed condition.
Figure 3:
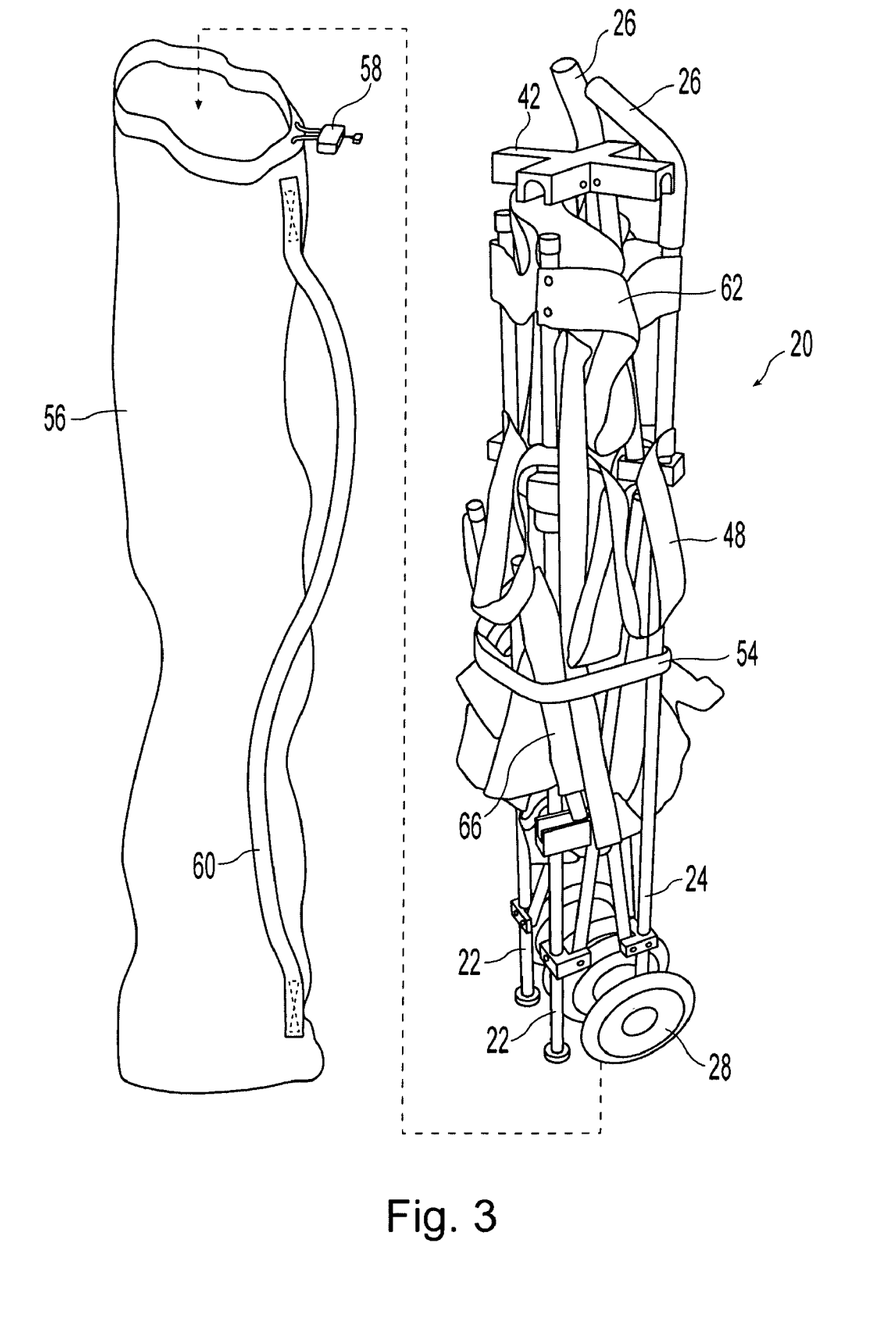
FIG. 3 is a perspective view of the first embodiment in a collapsed condition.

A first collapsible carrier 20 in accordance with the present invention is illustrated in FIGS. 1-3. Carrier 20 includes four elongate corner post members 22, 24 that are located at the four corners of carrier 20 and define axes 23. Corner post members 22, 24 are vertically oriented when carrier 20 is in its expanded configuration and positioned for use on a ground surface as depicted in FIG. 1 and define axes 23. The corner post members 22, 24 include a pair of rear corner post members 24 and forward corner post members 22. The two rear corner members 24 have upper ends 24a that are curved to form handles 26 and have wheel assemblies 28 attached to their lower ends 24b. Wheel assemblies 28 are similar to wheel assemblies found on baby strollers.

The two front vertically extending corner post members 22 have a ground engaging stationary foot 30 at their lower ends 22b instead of wheels and do not include handles at their upper ends 22a. Although corner post members 22, 24 are described as extending in a vertical direction and having upper and lower ends, these orientations, when used herein, refer to the situation when carrier 20 is in an expanded configuration and the wheeled assemblies 28 and ground engaging feet 30 are engaged with a level ground surface. In other situations, however, such as when carrier 20 is tilted on wheel assemblies 28 or collapsed for transport, corner post members 22, 24 will not necessarily be in a vertical orientation and the lower ends 22b, 24b of corner posts 22, 24 will not necessarily be positioned at a lower vertical height than the upper ends 22a, 24a.

Figure 6:
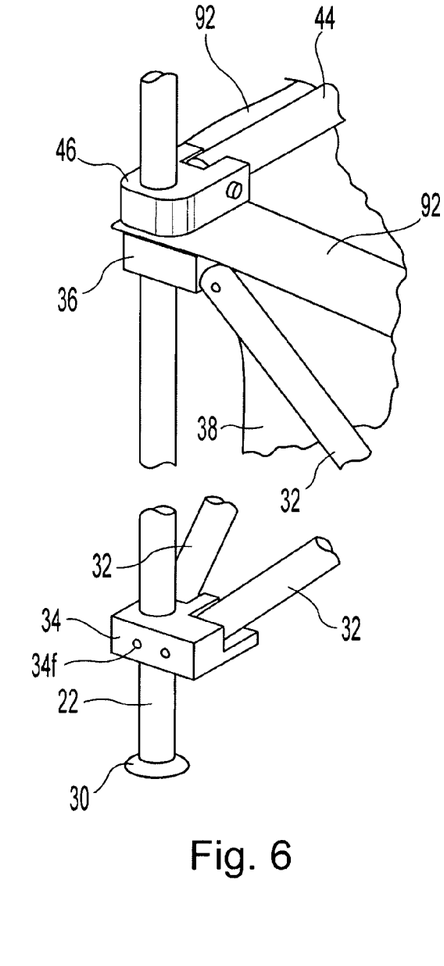
FIG. 6 is a partial perspective view of a front framing member.

Located on each of the four sides of the frame are framing assemblies 31. Each of the framing assemblies 31 includes two framing members 32 that are pivotally joined at their midpoints in an "x" shaped configuration. Framing members 32 are joined with a pivot pin formed by a bolt or rivet or other suitable means. Each framing assembly 31 is disposed between a respective set of adjacent corner post members to define the four sides of carrier 20. The framing assembly 31 located between rear corner post members 24 differs from the other three assemblies 31 by including a pivot guide 33. As can be seen in FIG. 6D, pivot guide 33 includes two slanted openings 33a that extend completely through guide 33. Each of the framing members 32 extends through one of the respective openings 33a. A lateral opening 33b also extends completely through guide 33 and a pivot pin extends through opening 33b and openings in the framing members 32 to pivotally join the two framing members 32.

The upper ends 36a and lower ends 34a of framing members 32 are pivotally connected to pivot blocks 34, 36 mounted on the vertical corner post members 22, 24. Lower ends 34a of the framing members 32 are pivotally attached to lower pivot blocks 34. Lower pivot blocks 34 are all fixed to the corner post members 22, 24 and do not move relative to the axes 23 of corner post members 22, 24. The upper ends 36a of framing members 32 are pivotally attached to sliding pivot blocks 36. Pivot blocks 36 are axially slidable on the corner post members 22, 24 to allow for the collapsing movement of the framing members 32. Thus, each of the lower ends 34a of framing members 32 are pivotally secured to one of the corner post members at an axially fixed location while the upper ends 36a of framing members 32 are pivotally and axially slidably secured to one of the corner post members.

Pivot blocks 34, 36 are advantageously formed by molding a polymeric material and bolts, rivets or other suitable means known to those having ordinary skill in the art can be used to pivotally connect the framing members 32 to pivot blocks 34, 36. Pivot blocks 34, 36 are best seen in FIGS. 6B and 6C. Pivot blocks 34, 36 have a common design. The only difference between blocks 34, 36 is the orientation of the blocks on the corner post members 22, 24 and the fixed securement of lower blocks 34 to the corner post members 22, 24. In the illustrated embodiment, a threaded fastener 34f is used to fix lower blocks 34 to corner post members 22, 24 (FIG. 6). As can be seen in FIGS. 6B and 6C, the pivot blocks 34, 36 include an aperture 34a, 36a through which the corner post member extends and two outwardly extending wall structures 34b, 36b. The wall structures 34b, 36c each include an opening, e.g., 34c in FIG. 6B, through which pivot pins are inserted to pivotally join framing members 32 to the pivot blocks 34, 36. A flat plate structure 34e, 36e provides some rigidity to the pivot blocks 34, 36. Although one particular design of pivot blocks 34, 36 is shown in the Figures, a wide variety of alternative pivot blocks and pivotal attachments can be used to couple the upper and lower ends of framing members 32 with the corner post members 22, 24.

A flexible fabric and mesh bag forming a flexible storage container 38 is suspended from the four corner post members 22, 24. Container 38 can be used to hold various items, including chairs that are collapsible into a generally tubular configuration. As can be seen in FIG. 1, when carrier 20 is in its expanded configuration, container 38 is positioned below a central bracing assembly 40 with opening 37 of container 38 lying proximate and below central bracing assembly 40.

Central bracing assembly 40 is attached to the four corner post members 22, 24. Central assembly 40 includes an "x" shaped central bracket 42 and four rigid elongate bracing members 44 that extend outwardly in an "x" shaped configuration. Bracket 42 is located at the center of the bracing assembly 40 and is pivotally connected to one end 44a of each of the four bracing members 44. The opposite ends 44b of the bracing members 44 are attached to a respective one of the four corner post members 22, 24 via an axially slidable pivot block 46 mounted on the corner post members 22, 24. Thus, each of the bracing members 44 has one end 44a pivotally secured to bracket 42 and another end 44b pivotally and axially slidably secured to a respective one of the corner post members 22, 24.

Figure 6A:
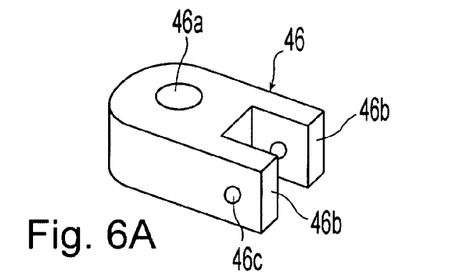
FIG. 6A is a perspective view of a pivot block for the bracing assembly.
Figure 6B:
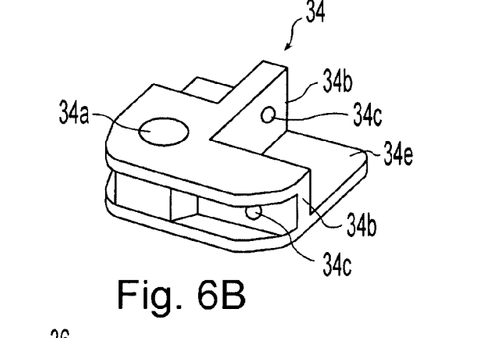
FIG. 6B is a perspective view of a pivot block for the framing assembly.
Figure 6C:
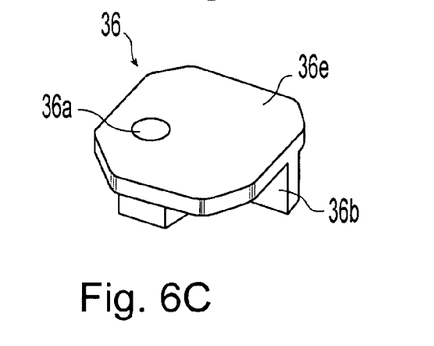
FIG. 6C is another perspective view of the pivot block for the framing assembly.
Figure 6D:
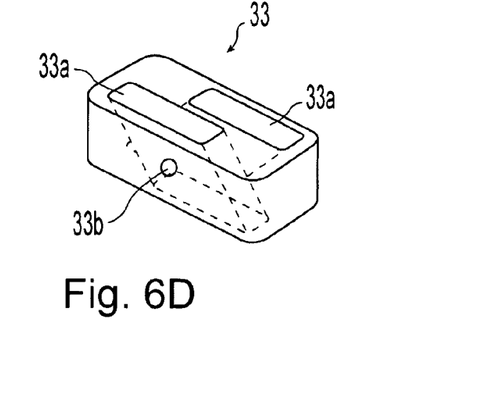
FIG. 6D is a perspective view of a pivot guide for the framing assembly.

Pivot blocks 46 are best seen in FIG. 6A and include an aperture 46a through which the corner post members 22, 24 extend. A pair of arms 46b project outwardly and have aligned openings 46c. After positioning an end 44b of a bracing member 44 between arms 46b, a pivot pin is inserted through openings 46c and an opening in the bracing member to pivotally secure the bracing member 44 to the pivot block 46. Pivot blocks 46 are advantageously formed by molding a polymeric material and bolts, rivets or other suitable means known to those having ordinary skill in the art can be used to pivotally connect the bracing members 44 to pivot blocks 46.

A strap 48 extends circumferentially about the carrier structure and is attached to each of the corner post members 22, 24 with a screw or similar fastener and thereby acts as a stop for the sliding pivot blocks 46 and thereby also limits the upward travel of the sliding pivot blocks 36 to which the framing members 32 are attached. Although strap 48 and its fasteners can act as a stop for pivot blocks 46, no such stop is required for the illustrated embodiments because the length of corner post members 22, 24, bracing members 44 and framing members 32 is such that sliding pivot blocks 36, 46 will not slide off of the corner post members 22, 24.

Moving carrier 20 from its collapsed condition (FIG. 3) to its expanded or use configuration (FIG. 1) is easily accomplished by simply pressing the bracing bracket 42 downwardly to bias the four corner post members 22, 24 apart and simultaneously expand the framing assemblies 31. By providing an interference fit between bracing members 44 and bracing bracket 42, the carrier 20 can be locked into its expanded condition by the engagement of bracket 42 with bracing members 44.

Figure 4:
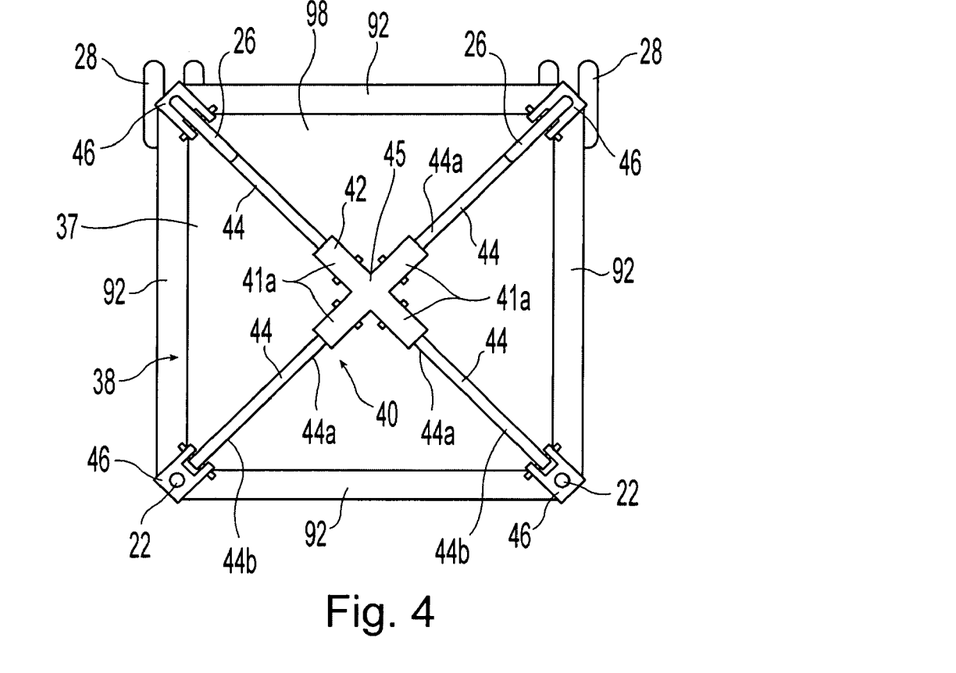
FIG. 4 is a top view of the first embodiment.
Figure 5:
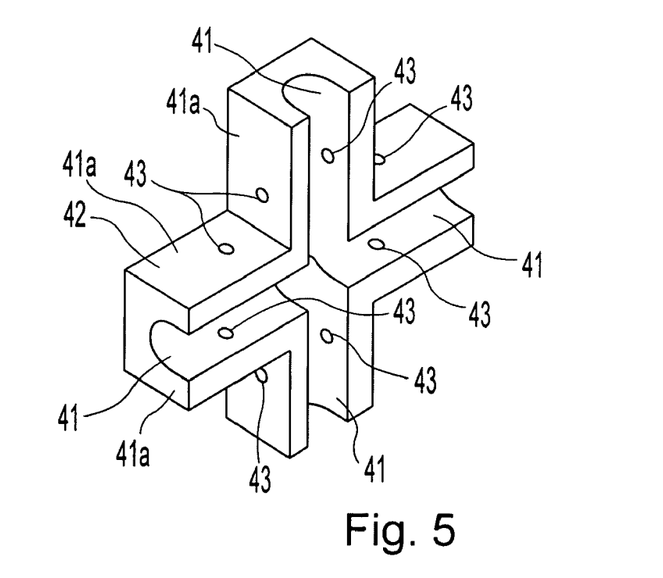
FIG. 5 is a perspective view of a bracing bracket.

Bracing assembly 40 can be seen in FIG. 4 and bracing bracket 42 is shown in FIG. 5. As can be seen in FIG. 5, bracket 42 includes four arms that are located at 90 degree angle intervals. Each of the four arms 41a has a downward opening U-shaped channel or cavity 41. Bracing members 44 are received in these U-shaped cavities 41 when carrier 20 is in its deployed or expanded configuration (FIG. 1). Pivot pins, e.g. bolts or rivets, are extended through openings 43 in bracket 42 and corresponding openings in bracing members 44 to pivotally join bracing members 44 to bracket 42. Openings 43 are located near the central intersection 45 of the four arms 41a such that members 44 are received within channels 41 when bracing assembly is in its expanded configuration. Bracket 42 is an aluminum bracket in the illustrated embodiment but may also be formed out of other suitable materials such as an injection molded plastic material. Similarly, the various pivot blocks discussed in this disclosure may be formed out of various suitable materials including aluminum and injection molded plastic materials.

It is also noted that the outer upper edge of container 38 is axially slidably disposed on corner post members 22, 24 between pivot blocks 36, 47. When carrier 20 is expanded to its use position (FIG. 1) pivot blocks 36, 46 and the outer upper edge of container 38 all slide downwardly on corner post members 22, 24. When carrier 20 is collapsed pivot blocks 36, 46 and container 38 all slide upwardly on corner post members 22, 24 away from lower, fixed, pivot blocks 34 (see FIG. 6). As a result, the carrier 20 is collapsible in both a front-to-back direction (see arrows 50 in FIG. 2) and in a side-to-side direction (see arrows 52 in FIG. 2). This allows the carrier to be collapsed into a compact tubular "bundle of sticks".

In the illustrated embodiment, all of the structural members 22, 24, 32, 44 forming carrier 20 are linear metal tubes (e.g., aluminum) without any bends or other deviations (except for handles 26) from a linear configuration and thereby facilitate the efficient manufacture of carrier 20. It is also noted that while bracing members 44 and the upper ends of framing members 32 are attached to two separate sliding pivot blocks 36, 46 with container 38 therebetween on each of the corner post members 22, 24, in alternative embodiments, a single sliding pivot block on each of the corner post members 22, 24 could be used to couple bracing member 44, framing member 32 and flexible container 38 to the corner post members 22, 24.

The positioning of bracing assembly 40 is such that it is positioned above the central opening 37 of container 38 and each of the bracing members 44 are coupled (via pivot blocks 46) with one of the corner post members 22, 24 at a location proximate the midpoint of the corner post member 22, 24 when carrier 20 is in its upright and expanded configuration (FIG. 1). By securing flexible container 38 to each of the corner post members 22, 24 at an axial location between the upper ends 36a of framing members 32 and the outer ends 44b of bracing members 44, the expansion and collapse of container 38 is less likely to interfere with the expansion and collapse of framing assemblies 31 or bracing assembly 40.

It is also noted that by positioning the bracing assembly 40 such that bracket 42 is positioned proximate and above the upper ends 22a, 24a of corner post members 22, 24 when carrier 20 is in an upright and collapsed configuration (FIG. 3), the carrier can be collapsed into a relatively smaller diameter bundle. Similarly, by utilizing handles 26 on rear corner post members 24 that project laterally in a general direction toward the diagonally opposite forward corner post member, the handles can be disposed proximate and vertically above the bracing bracket 42 when the carrier is in an upright and collapsed configuration (FIG. 3). This orientation of handles 26 also facilitates the collapse of carrier 20 into a relatively smaller diameter bundle. By allowing carrier 20 to be collapsed into a relatively smaller diameter bundle, carrier 20 can be more easily transported when collapsed and also more easily inserted into a storage bag or sleeve 56.

A nylon strap 54 is attached to one of the corner post members (FIG. 1) and includes patches of hook and loop fasteners to allow the two opposing ends of strap 54 to encircle carrier 20 and be joined together when carrier 20 is in a collapsed condition (FIG. 3). Strap 54 can thereby secure carrier 20 in its compact collapsed condition. When carrier 20 is in its collapsed condition, it can be placed in a long tubular sack or sleeve 56 which is illustrated in FIG. 3. The illustrated storage sleeve 56 includes a drawstring 58 at its open end and a shoulder strap 60 to allow the collapsed carrier 20 to be easily transported when it is in its collapsed condition and disposed in storage sleeve 56.

In the carrier 20 illustrated in FIGS. 1-3, an upper band of strapping 62 extends along the outer perimeter of the corner post members 22, 24 near the top of the corner frame members 22, 24 and has an outward facing surface that is formed by hook fasteners to thereby allow for the attachment of small accessories, such as a water bottle holster or similar item, having a patch of loop fasteners. Such hook and loop fasteners are commercially available and include those sold under the Velcro® trademark. FIG. 10 illustrates how two such accessory items 84, 86 can be attached to upper strap 62. The first of these accessory items is a storage pouch 84 that can be used to store small loose items. The second item is a water bottle holster 86 which can be used to store a water bottle 88. Both pouch 84 and holster 86 can be attached to strap 62 by attaching a patch of loop fasteners to these items and then pressing that patch of loop fasteners against the hook fastener material on strap 62. Various other suitable means of attaching such accessory items to strap 62 can also be employed with the present invention.

Figure 7:
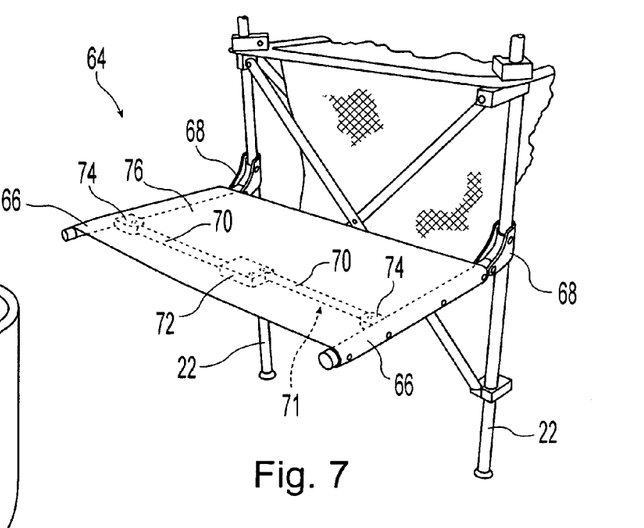
FIG. 7 is a partial perspective view showing the front shelf in a deployed position.
Figure 8:
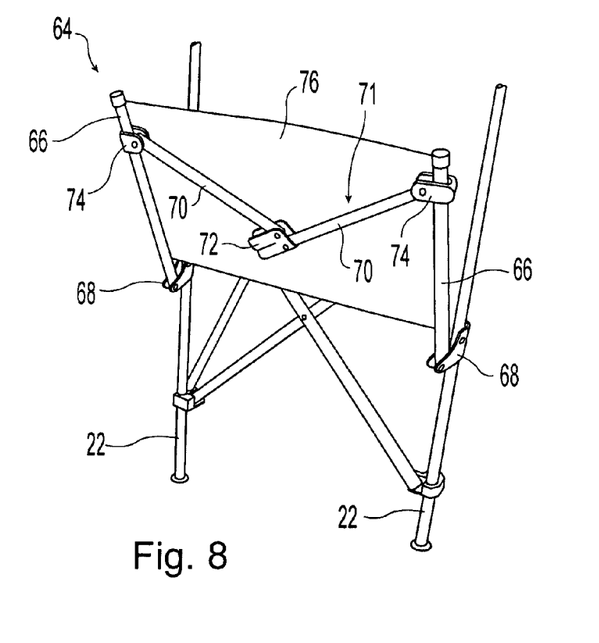
FIG. 8 is a partial perspective view showing the front shelf in a partially collapsed condition.

The illustrated carrier 20 also includes a laterally collapsible and pivotal shelf 64 that is attached to the two front corner post members 22. As can be seen in FIGS. 7 and 8, shelf unit 64 projects outwardly from carrier 20 and has two rigid support members 66 that are pivotally connected to the two corner post members 22 via pivot blocks 68 and a pivot pin. In the illustrated embodiment, pivot blocks 68 are secured to front corner post members 22 at an axial location between lower pivot blocks 34 (and attached lower ends 34a of framing members 32) and sliding pivot blocks 36 (and attached upper ends 36a of framing members 32).

Figure 7A:
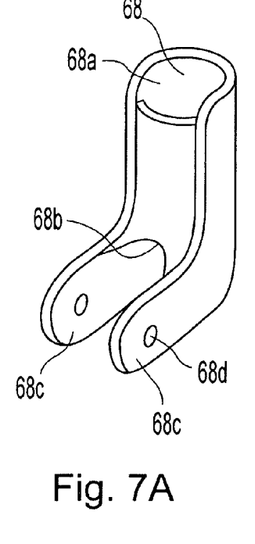
FIG. 7A is a perspective view of the pivot block for the shelf.

A pivot block 68 is shown in FIG. 7A. Pivot block 68 includes a sleeve 68a through which a corner post member 22, 24 is extended. A threaded fastener extending through sleeve 68a or other suitable means is used to secure pivot blocks 68 on the corner post members 22, 24 at fixed positions. A bottom lip 68b of sleeve 68a projects slightly outwardly between arms 68c. Openings 68d are located in arms 68c for receiving a pivot pin. A support member 66 is positioned between arms 68c and a bolt, rivet or other suitable part is inserted through openings 68d and support member 66 to pivotally secure the support member 66 to pivot block 68 and the associated corner post member 22, 24. When support member 66 is extended outwardly from carrier 20, the proximal end of member 66 engages lip 68b to thereby retain support member 66 in a substantially horizontal position, i.e., at a substantially perpendicular angle to the corner post member.

The illustrated pivot block 68 is an injection molded plastic part. Various other materials and alternative configurations of pivot blocks 68, however, could also be employed. For example, pivot blocks 68 could include upwardly opening U-shaped cavities which provide support to members 66 when members 66 extend horizontally outwardly from carrier 20.

A cross-member 71 extends between the two support members 66 and has two rigid lateral members 70 that are pivotally joined together at a central hinge 72. Lateral members 70 are pivotally connected to support members 66 via pivot blocks 74. Central hinge 72 and the pivotal connection of lateral members 70 to support members 66 allow the shelf to be laterally collapsed when collapsing the carrier. FIG. 7 illustrates shelf 64 in its deployed or use condition while FIG. 8 illustrates shelf 64 pivoted upwardly and partially collapsed in a side-to-side direction. When collapsing carrier 20, shelf 64 is pivoted upwardly through a greater angle than shown in FIG. 8 so that support members 66 are positioned substantially parallel with corner post members 22 when carrier 20 is fully collapsed.

A flexible fabric panel 76 is secured to the two support members 66 and extends therebetween to provide a support shelf. Straps 78 (FIG. 9) can be secured to the front corner post members 22 and be used to secure objects, such as a small cooler 80, that are positioned on the shelf. Straps 78 may include hook and loop fasteners to allow for the quick and convenient securing of objects. It is also noted that, in the illustrated embodiment, side members 66 and lateral members 70 are all linear metal tubes to facilitate the efficient manufacture of carrier 20. In other embodiments of carrier 20, shelf 64 could be formed out of larger structural members or include further structural members, e.g., front pivoting legs that engage the ground when shelf 64 is in its deployed position, to thereby allow shelf 64 to act as a seat when deployed.

Figure 9:
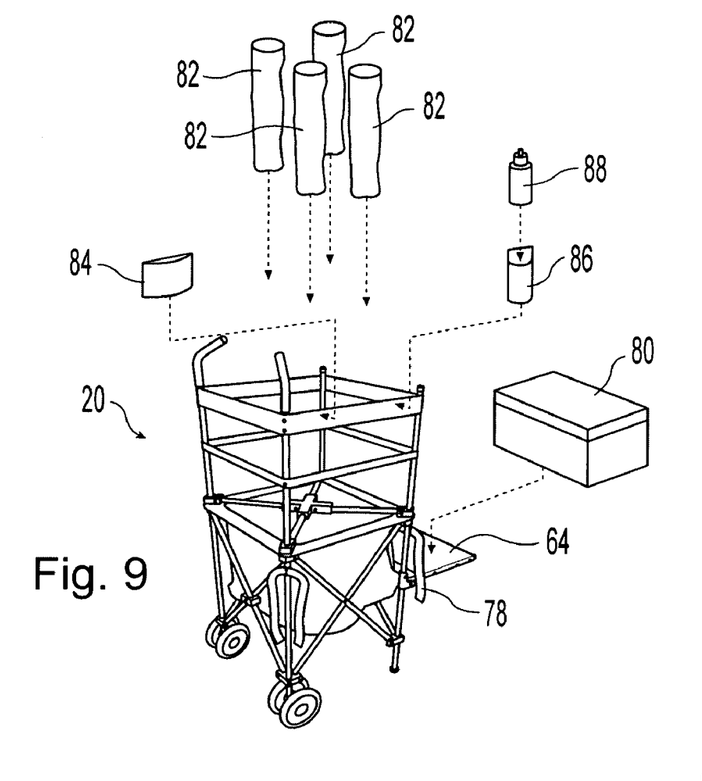
FIG. 9 is an exploded schematic view of first embodiment with accessories and items that can be carried.

FIG. 9 schematically illustrates how a carrier 20 can be loaded with collapsed chairs 82 and a cooler 80. Collapsible chairs 82 (FIG. 10) are well known in the art and can be collapsed into cylindrical bundles and placed in storage sleeves as shown in FIG. 9. Bracing members 44 subdivide the space above the central opening 37 of container 38 into four separate compartments. This placement of bracing assembly 40 not only places bracket 42 at a convenient location where it can easily be snapped into and out of engagement with bracing members 44 to secure carrier in its expanded configuration or allow for its collapse, but it also allows a plurality of chairs 82 to be placed in bag 38 while keeping the chairs 82 separated. This can facilitate the transport of the chairs 82 in an orderly condition. As mentioned above, cooler 80 may be located on shelf 64 and secured with straps 78. After carrier 20 has been loaded, it can be tilted back on wheeled assemblies 28 with feet 30 elevated above the ground and the user can push or pull the carrier 20 over the ground surface utilizing handles 26. When the carrier 20 is stood in an upright position with both wheeled assemblies 28 and stationary feet 30 engaged with the ground surface, stationary feet 30 will inhibit the unintentional movement of carrier 20 on the ground surface. In this regard it is noted that the term stationary foot refers herein to a ground engagable part of the carrier that does not move relative to the carrier 20 when the stationary foot is engaged with the ground surface.

Flat folding chairs (not shown) commonly referred to as "lawn chairs" may also be easily transported by carrier 20 by placing such chairs on shelf 64. In this regard it is noted that cooler 80 may alternatively be positioned on top of bracing members 44 and bracing bracket 42 when no objects that project above the top of container 38 are being moved.

Although carrier 20 is shown transporting chairs and a cooler, it can also be used to transport a wide variety of other items. Carrier 20 is well suited for transporting various objects useful at outdoor sporting events (soccer games, baseball games, etc.), campgrounds, outdoor concerts, picnics, tailgaiting events, races/NASCAR events, lake-house to dock transportation, shooting events and any number of other situations or events that require the movement of objects. For example, it could be used by a baseball coach or player to transport baseball equipment such as bats, balls and gloves. Container 38 and its compartments defined by bracing members 44 are particularly well suited for the transport of baseball bats.

Figure 11:
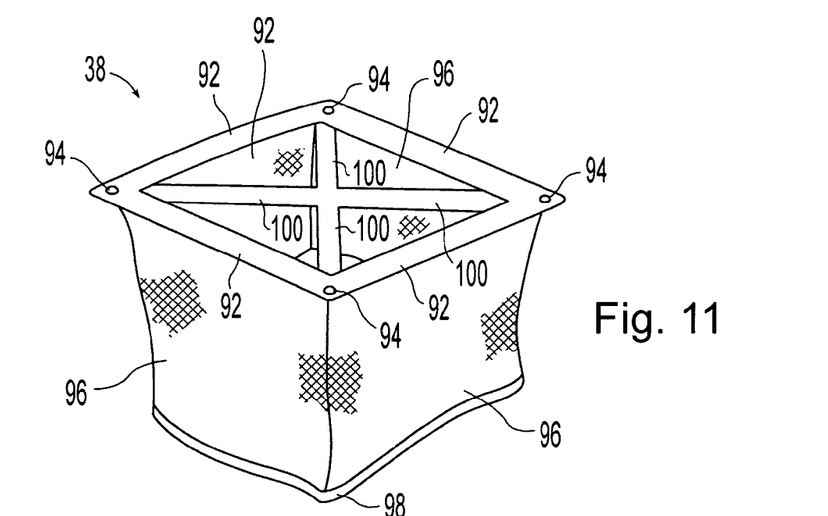
FIG. 11 is a perspective view of the storage bag.

The bag-like flexible container 38 is best seen in FIG. 11. Container 38 includes an upper lip 92 formed out of a strong nylon fabric and which includes four openings 94 through which the corner post members 22, 24 extend. Openings 94 allow the upper edge of container 38 to slide along corner post members 22, 24. As can be seen in FIG. 6, upper lip 92 is trapped between pivot blocks 36 and 46 so that the upper edge of container 38 is maintained at an appropriate location along corner post members 22, 24. The illustrated container 38 includes mesh side panels 96 and a nylon fabric bottom panel 98. Nylon straps 100 extend across the top opening of bag 38 and lie directly below bracing members 44 when carrier 20 is in its expanded configuration.

Figure 12:
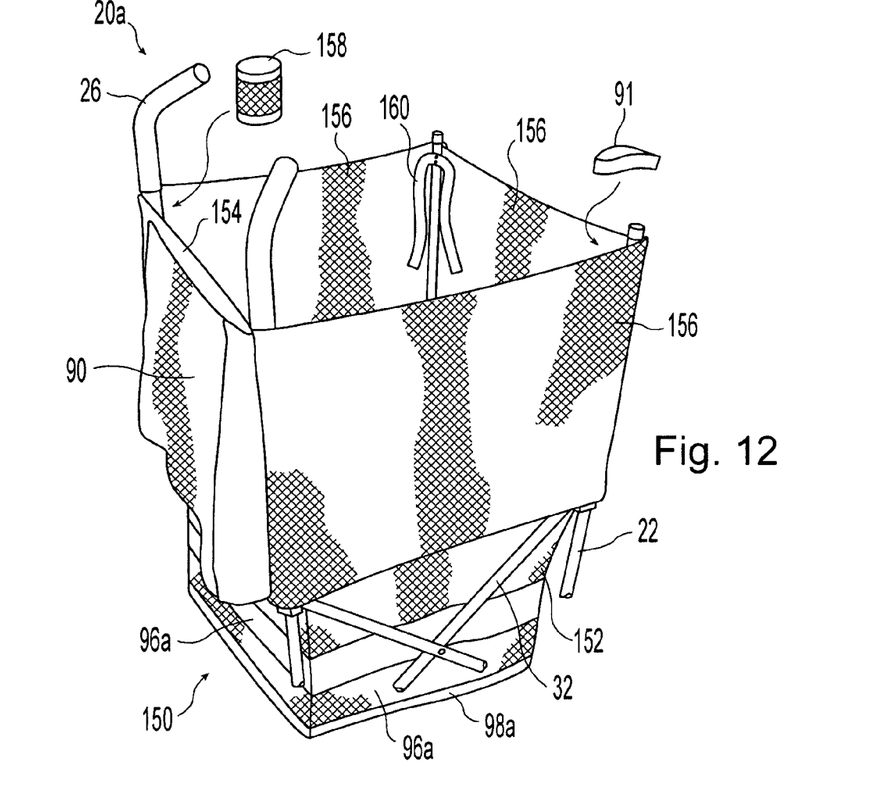
FIG. 12 is a partial perspective view illustrating the upper portion of an alternative carrier with an enclosed upper area.
Figure 13:
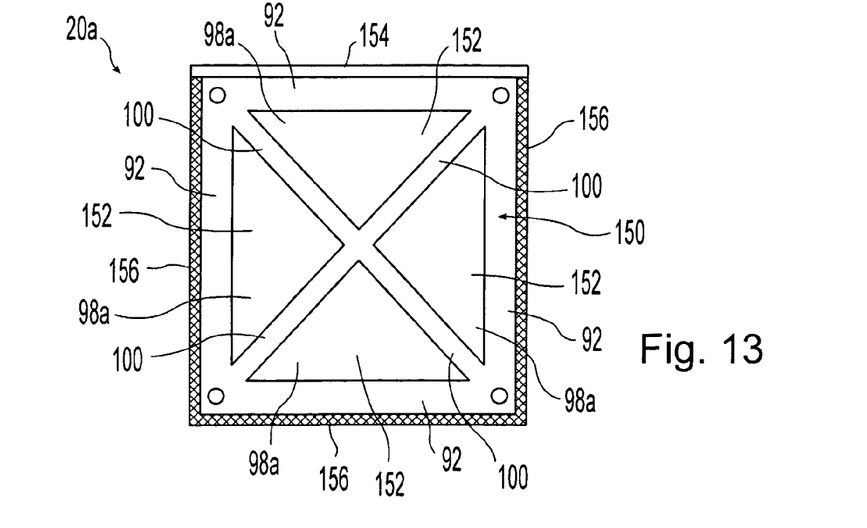
FIG. 13 is a bottom view of an alternative storage bag configuration.

An alternative flexible container 150 is shown in FIGS. 12 and 13. Like container 38, flexible container 150 includes an upper lip 92 that is formed out of a nylon fabric and has four openings at its corners through which corner post members 22, 24 slidably extend. Nylon straps 100 extend in an X-shaped pattern between the four corners of container 150. Unlike container 38 which defines one large cavity, container 150 has four separate compartments 152. The four separate compartments 152 each have a triangular shape that is defined by upper lip 92 and nylon straps 100. As can be most easily seen in FIG. 13, the disclosed compartments 152 have triangular shaped bottom panels 98a. Side panels 96a extend from the bottom panels 98a to upper lip 92 and nylon straps 100. In the embodiment illustrated in FIGS. 12 and 13, bottom panel 98a is formed out of a nylon fabric while side panels 96a are formed out of alternating swaths of mesh material and nylon fabric. Various other materials can also be used to form flexible containers 38 and 150.

The carrier 20a depicted in FIGS. 12 and 13 also includes further modifications above flexible container 150. A permanently secured storage pouch 90 is shown in FIG. 12. Optional pouch 90 is formed out of both nylon fabric and a mesh material and is secured to a back nylon fabric panel 154 between rear corner post members 24. Mesh side panels 156 are attached between adjacent corner post members 22, 24 along the other three sides of carrier 20a. The lower edges of panels 154 and 156 are stitched to the outer edge of lip 92. Fasteners securing back panel 154 and upper side panels 156 to corner post members 22, 24 are located outside the axial sliding zone of pivot blocks 36, 46.

Also shown in FIG. 12 is a small fabric loop 91 that is secured to a corner post member 22 and is positioned within side panels 156. An umbrella can be positioned in container 150 and inserted through loop 91 to secure the umbrella in place. Similarly, a fabric and mesh cup holder 158 can be secured to the interior of one or more corner post members 22, 24. Also shown is a short strap 160 having hook and loop fasteners for securing various items that might be transported by carrier 20a.

Figure 14:
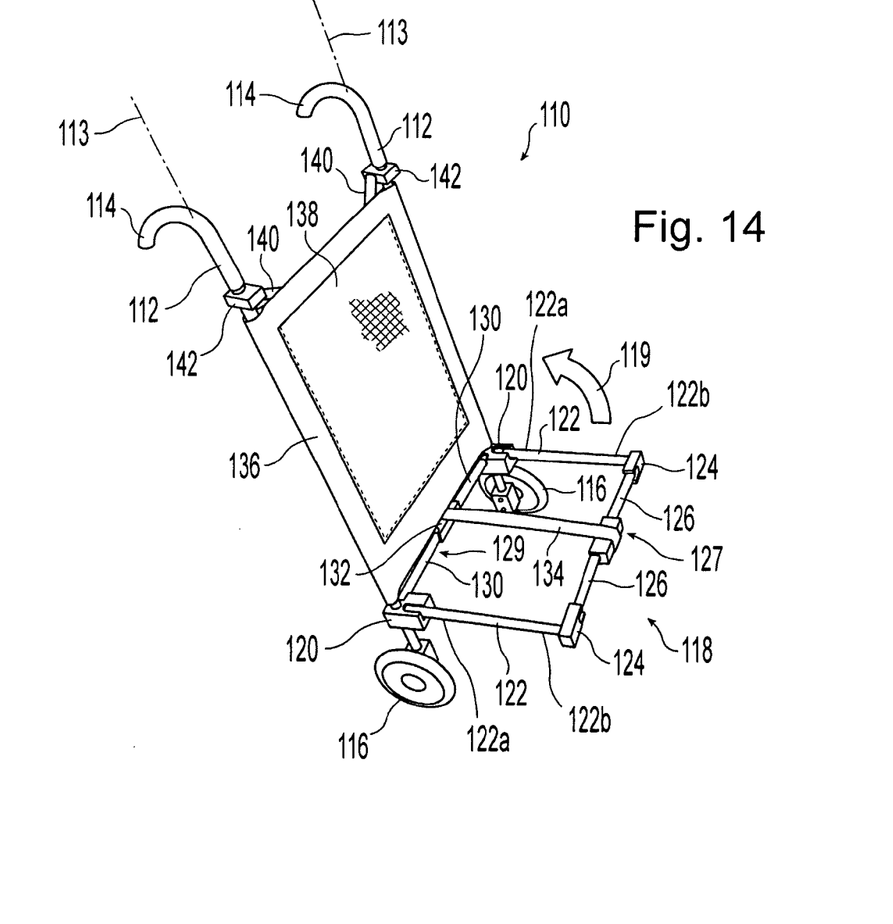
FIG. 14 is a perspective view of a collapsible carrier having a hand truck configuration.
Figures 15, 16:
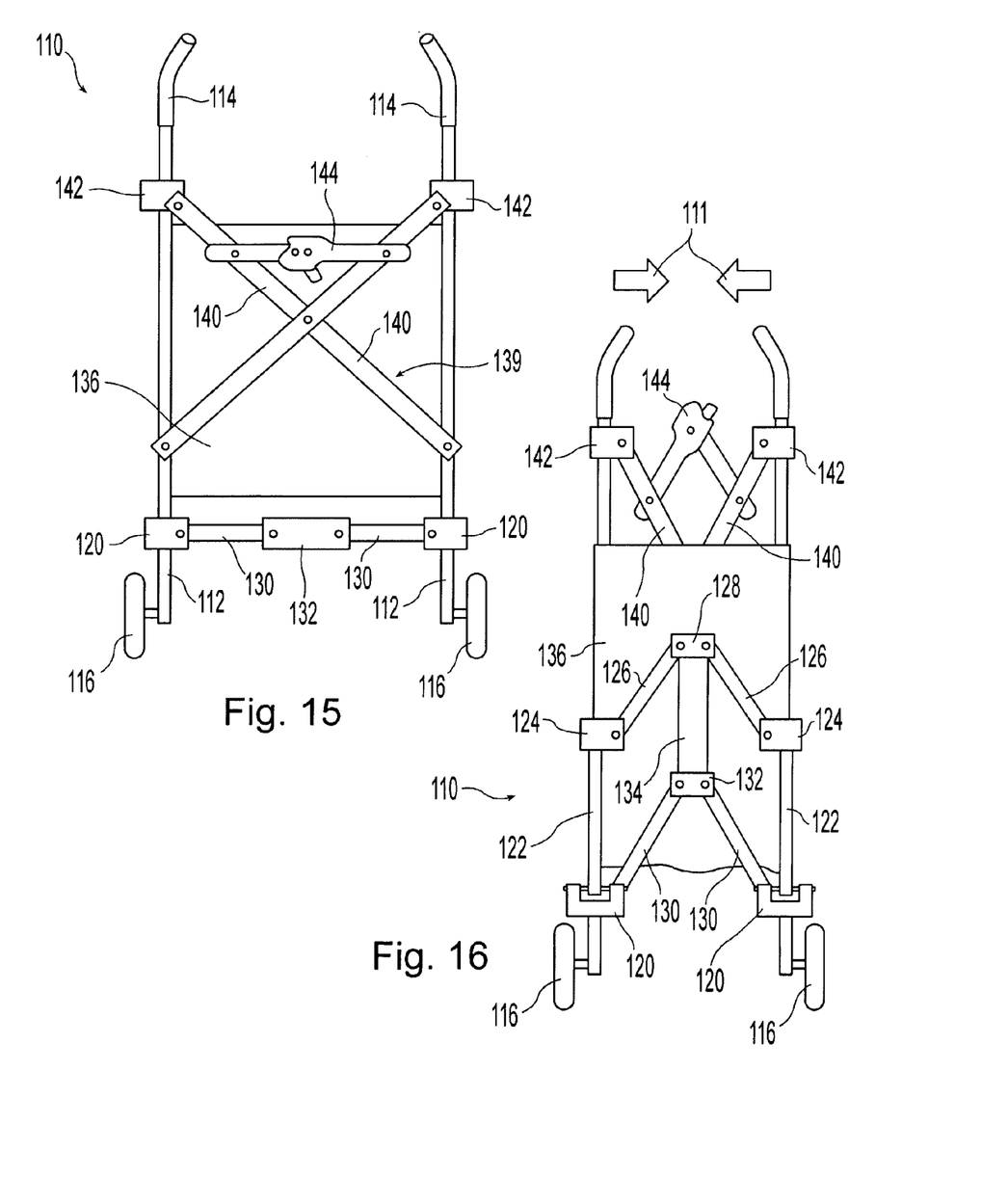
FIG. 15 is a rear view of the collapsible hand truck.
FIG. 16 is a front view of the collapsible hand truck in a partially collapsed condition.

An alternative collapsible carrier 110 is illustrated in FIGS. 13-15. Carrier 110 takes a form similar to that of a hand-truck. Carrier 110 includes two rigid elongate upright members 112 defining axes 113 and having handles 114 on their upper ends. Wheels 116 are rotatably secured to the lower ends of upright members 112.

A laterally collapsible support structure 118 is pivotally secured to upright members 112 via pivot blocks 120. Support structure 118 includes two rigid elongate support members 122. The proximal ends 122a of support members 122 are pivotally connected to pivot blocks 120. Pivot blocks 124 are located at the distal ends 122b of side support members 122. Distal lateral members 126 are pivotally connected to pivot blocks 124 at one end and pivotally connected to distal hinge 128 at their other end to form a distal cross member 127. Proximal lateral members 130 are pivotally connected to pivot blocks 120 at one end and pivotally connected to proximal hinge 132 at their other ends to form a proximal cross member 129. The opposite ends of flexible strapping 134 are connected to distal and proximal hinges 128, 132 such that strapping 134 forms a flexible linkage member. Linkage member 134 can be formed out of any suitable material such as a nylon fabric. In the illustrated embodiment, a nylon fabric panel 136 with a mesh pouch 138 extends between frame members 112. Pivot arrow 119 indicates how support structure 118 can be pivoted to a position adjacent fabric panel 136.

When in its deployed condition (FIG. 13) objects, such as a cooler 80, can be placed on support structure 118. Carrier 110 can then be tilted backward so that only wheels 116 engage the ground surface. The carrier 110 can then be pushed or pulled along the ground by using handles 114. When not in use, carrier 110 can be collapsed. To collapse carrier 110, structure 118 is pivoted upwards adjacent fabric panel 136 (FIG. 15). Hinges 126 and 132 allow support structure 118 to be collapsed in a side-to-side direction (as indicated by arrows 111 in FIG. 15) with the side frame members 112 being moved toward each other. In this regard, it is noted that by providing a linkage member 134 between hinges 128, 132, a user merely has to lift distal hinge 128 to simultaneously displace proximal hinge 132 and thereby pivotally collapse both the distal cross member 127 and the proximal cross member 129 about the hinged midsections of cross members 127, 129 defined by hinges 128, 132.

A rear view of carrier 110 is shown in FIG. 14 and shows bracing assembly 139. Bracing assembly 139 includes rigid bracing members 140 and a latch mechanism 144. Bracing members 140 are pivotally secured and axially fixed to framing members 112 at the lower ends of bracing members 40. The bracing members 40 are pivotally connected together at their midpoints and are pivotally secured to sliding pivot blocks 142 at their upper ends. Pivot blocks 142 slide along framing members 112 as carrier 110 is collapsed or expanded. A latch mechanism 144 is used to secure carrier 110 in its expanded use condition. In the illustrated embodiment, structural members 112, 122, 126 and 130 are all formed out of linear aluminum tubing (excepting handles 114) to facilitate the efficient manufacture of carrier 110. In this regard it is noted that a short length of the upper end of the tubing forming upright members 112 are bent to form handles 114.

While this invention has been described as having an exemplary design, the present invention may be further modified within the spirit and scope of this disclosure. This application is therefore intended to cover any variations, uses, or adaptations of the invention using its general principles.

What is claimed is:

1. A collapsible carrier, said carrier comprising:

four elongate corner post members each said corner post member having an upper end, a lower end and defining an axial length therebetween, said corner post members defining a pair of rear corner post members and a pair of forward corner post members wherein each of said rear corner post members has a rotatable support wheel secured thereto proximate said lower end thereof;

four framing assemblies, each of said framing assemblies being operably disposed between a respective set of adjacent corner post members to thereby define four sides of said carrier and wherein each of said framing assemblies includes a first rigid elongate framing member and a second rigid elongate framing member with said first and second framing members being pivotally secured together proximate midpoints of each of said first and second framing members with lower ends of said first and second framing members being pivotally secured to opposite ones of said adjacent corner post members at fixed axial locations and upper ends of said first and second framing members being pivotally and axially slidably secured to said adjacent corner post members at axial locations respectively above said fixed axial locations of said other framing member whereby each of said framing assemblies is repositionable between an X-shaped expanded configuration with said adjacent corner post members being spaced apart and a collapsed configuration with said adjacent corner post members being positioned proximate one another;

a central bracing assembly comprising a central bracket member and four rigid elongate bracing members, each of said bracing members having a first end pivotally secured to said central bracket member and a second end pivotally and axially slidably secured to a respective one of said corner post members at an axial position proximate a respective one of said upper ends of said framing members whereby said central bracing assembly defines a substantially X-shaped assembly disposed centrally between said four corner post members when each of said framing assemblies is in said expanded configuration and, when each of said framing assemblies is in said collapsed configuration, said bracing assembly is in a collapsed configuration; and a flexible container secured to said carrier and positioned below said central bracing assembly when each of said framing assemblies is in said expanded configuration.

2. The collapsible carrier of claim 1 wherein said bracing members are each pivotally coupled with a respective one of said corner post members at an axial position located proximate a midpoint of said corner post members when said carrier is an expanded configuration.

3. The collapsible carrier of claim 2 wherein said central bracket member includes four arms forming a substantially X-shaped configuration with a central intersection, each of said arms defining a downward opening substantially U-shaped channel, each of said bracing members being pivotally secured proximate said central intersection and being received in a respective one of said U-shaped channels when each of said framing assemblies is in said expanded configuration.

4. The collapsible carrier of claim 2 wherein said flexible container defines a central opening disposed below said central bracing assembly when said carrier is in an expanded and upright configuration.

5. The collapsible carrier of claim 2 wherein, when said carrier is in a collapsed and upright configuration, said central bracket member is positioned proximate and vertically above said upper ends of said corner post members.

6. The collapsible carrier of claim 5 wherein said upper ends of said rear corner post members each define a handle, said handles projecting laterally from said rear corner post members in a general direction toward the diagonally opposite forward corner post member and wherein, when said carrier is in a collapsed and upright configuration, said handles are disposed proximate and vertically above said central bracket member.

7. The collapsible carrier of claim 1 further comprising a plurality of sliding pivot blocks, at least one of said plurality of sliding pivot blocks being axially slidably disposed on each of said corner post members and wherein said upper ends of said framing members are each pivotally secured to one of said sliding pivot blocks and said second ends of said bracing members are each pivotally secured to one of said sliding pivot blocks.

8. The collapsible carrier of claim 7 wherein said flexible container is slidingly secured to each of said corner post members at an axial location between a respective one of said upper ends of said framing members and a respective one of said second ends of said bracing members.

9. The collapsible carrier of claim 8 wherein said central bracket member includes four arms forming a substantially X-shaped configuration with a central intersection, each of said arms defining a downward opening substantially U-shaped channel, each of said bracing members being pivotally secured proximate said central intersection and being received in a respective one of said U-shaped channels when each of said framing assemblies is in said expanded configuration.

10. The collapsible carrier of claim 9 wherein, when said carrier is in a collapsed and upright configuration, said central bracket member is positioned proximate and vertically above said upper ends of said corner post members.

11. The collapsible carrier of claim 1 wherein said lower ends of said forward corner post members each define a ground engageable stationary foot.

12. The collapsible carrier of claim 1 further comprising a projecting shelf having first and second rigid support members, each of said support members being pivotally secured to a respective one of said forward corner post members; and a flexible material secured to and extending between said first and second support members.

13. The collapsible carrier of claim 12 wherein said first and second support members are pivotally secured to said forward corner post members at an axial location between a respective one of said lower ends of said framing members and a respective one of said upper ends of said framing members.

14. The collapsible carrier of claim 13 wherein said shelf further comprises a cross member, said cross member including a first lateral member pivotally secured to said first support member and a second lateral member pivotally secured to said second support member, said first and second lateral members being pivotally joined together.

15. A collapsible carrier, said carrier comprising:
four elongate corner post members each said corner post member having an upper end, a lower end and defining an axial length therebetween, said corner post members defining a pair of rear corner post members and a pair of forward corner post members wherein each of said rear corner post members has a rotatable support wheel secured thereto proximate said lower end thereof;
four framing assemblies, each of said framing assemblies being operably disposed between a respective set of adjacent corner post members to thereby define four sides of said carrier and wherein each of said framing assemblies includes a first rigid elongate framing member and a second rigid elongate framing member with said first and second framing members being pivotally secured together proximate midpoints of each of said first and second framing members with lower ends of said first and second framing members being pivotally secured to opposite ones of said adjacent corner post members at fixed axial locations and upper ends of said first and second framing members being pivotally and axially slidably secured to said adjacent corner post members at axial locations respectively above said fixed axial locations of said other framing member whereby each of said framing assemblies is repositionable between an X-shaped expanded configuration with said adjacent corner post members being spaced apart and a collapsed configuration with said adjacent corner post members being positioned proximate one another;
a central bracing assembly comprising a central bracket member and four rigid elongate bracing members, each of said bracing members having a first end pivotally secured to said central bracket member and a second end pivotally and axially slidably secured to a respective one of said corner post members at an axial position proximate a respective one of said upper ends of said framing members whereby said central bracing assembly defines a substantially X-shaped assembly disposed centrally between said four corner post members when each of said framing assemblies is in said expanded configuration and, when each of said framing assemblies is in said collapsed configuration, said bracing assembly is in a collapsed configuration and wherein said bracing members are each pivotally coupled with a respective one of said corner post members at an axial position located proximate a midpoint of each of said respective corner post members when said carrier is an expanded configuration;
a plurality of sliding pivot blocks, at least one of said plurality of sliding pivot blocks being axially slidably disposed on each of said corner post members and wherein said upper ends of said framing members are each pivotally secured to one of said sliding pivot blocks and said second ends of said bracing members are each pivotally secured to one of said sliding pivot blocks; and
a flexible container secured to said carrier and positioned below said central bracing assembly when each of said framing assemblies is in said expanded configuration.

16. The collapsible carrier of claim 15 wherein said central bracket member includes four arms forming a substantially X-shaped configuration with a central intersection, each of said arms defining a downward opening substantially U-shaped channel, each of said bracing members being pivotally secured proximate said central intersection and being received in a respective one of said U-shaped channels when each of said framing assemblies is in said expanded configuration.

17. The collapsible carrier of claim 16 wherein, when said carrier is in a collapsed and upright configuration, said central bracket member is positioned proximate and vertically above said upper ends of said corner post members.

* * * * *